(12) United States Patent
Gerstle

(10) Patent No.: US 9,512,867 B2
(45) Date of Patent: *Dec. 6, 2016

(54) KRAFT MORTISE AND TENON ASSEMBLY

(71) Applicant: Matthew E Gerstle, Appleton, WI (US)

(72) Inventor: Matthew E Gerstle, Appleton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/154,935

(22) Filed: May 13, 2016

(65) Prior Publication Data
US 2016/0258463 A1   Sep. 8, 2016

Related U.S. Application Data

(62) Division of application No. 14/620,181, filed on Feb. 11, 2015, now Pat. No. 9,468,298.

(60) Provisional application No. 61/938,913, filed on Feb. 12, 2014.

(51) Int. Cl.
| | | |
|---|---|---|
| *A47C 7/00* | (2006.01) | |
| *F16B 12/12* | (2006.01) | |
| *A47C 5/00* | (2006.01) | |
| *A47B 13/00* | (2006.01) | |
| *A47B 13/08* | (2006.01) | |
| *A47B 47/04* | (2006.01) | |
| *A47B 47/06* | (2006.01) | |
| *A47C 5/14* | (2006.01) | |
| *A47C 11/00* | (2006.01) | |
| *A47D 1/00* | (2006.01) | |
| *A47F 1/04* | (2006.01) | |
| *A47F 5/11* | (2006.01) | |

(Continued)

(52) U.S. Cl.
CPC .............. *F16B 12/125* (2013.01); *A47B 13/00* (2013.01); *A47B 13/086* (2013.01); *A47B 47/042* (2013.01); *A47B 47/06* (2013.01); *A47C 4/021* (2013.01); *A47C 5/005* (2013.01); *A47C 5/14* (2013.01); *A47C 11/00* (2013.01); *A47D 1/00* (2013.01); *A47D 3/00* (2013.01); *A47F 1/04* (2013.01); *A47F 5/11* (2013.01); *F16B 5/0012* (2013.01); *F16B 12/00* (2013.01); *A47B 43/02* (2013.01); *A47B 2220/0086* (2013.01); *A47C 4/00* (2013.01); *A47C 4/02* (2013.01); *Y10T 403/7015* (2015.01); *Y10T 403/72* (2015.01)

(58) Field of Classification Search
CPC ................ A47B 3/06; A47B 47/0075; A47B 2230/0085; A47B 43/02; A47B 2220/0086; A47C 5/005; A47C 4/02; A47C 4/00; A47C 4/021; A47C 5/00; A47C 4/03; Y10T 403/72; Y10T 403/7094; A47D 11/00
USPC ......... 297/440.1, 440.12, 440.13, 16.1, 16.2, 297/440.2, 440.14; 403/381; 108/153.1, 108/157.14; 428/542.8; D6/368
See application file for complete search history.

(56) References Cited

U.S. PATENT DOCUMENTS

| | | | | |
|---|---|---|---|---|
| 1,735,851 A | * | 11/1929 | Burton | A47C 4/021 |
| | | | | 297/440.13 |
| 3,312,503 A | * | 4/1967 | Suzuki | A47C 5/005 |
| | | | | 297/440.12 |

(Continued)

*Primary Examiner* — Chi Q Nguyen
(74) *Attorney, Agent, or Firm* — Brian J. Elliott

(57) ABSTRACT

A mortise and tenon assembly comprising the insertion of tenons of multilayered corrugated Kraft into mortises in panels of corrugated Kraft. The tenons have a folding flap and tuck slot that form an interlocking connection. The assembly is practical and easy for the user to construct without needing to use tools. It enables and facilitates the transport of the structures prior to assembly in parts arranged in a compact manner, occupying a relatively small space.

13 Claims, 23 Drawing Sheets

(51) Int. Cl.
*F16B 12/00* (2006.01)
*A47D 3/00* (2006.01)
*F16B 5/00* (2006.01)
*A47C 4/02* (2006.01)
*A47C 4/00* (2006.01)
*A47B 43/02* (2006.01)

(56) References Cited

U.S. PATENT DOCUMENTS

| | | | | |
|---|---|---|---|---|
| 4,085,970 A * | 4/1978 | Klein | | A47C 5/005 297/440.12 |
| 4,934,756 A * | 6/1990 | Webb | | A47C 5/005 297/440.12 |
| 5,263,766 A * | 11/1993 | McCullough | | A47C 4/021 297/440.13 |
| 5,697,675 A * | 12/1997 | DeWitt | | A47C 5/005 297/188.01 |
| 5,795,027 A * | 8/1998 | Howard | | A47C 5/005 297/440.1 |
| 5,860,704 A * | 1/1999 | Smith | | A47C 5/005 297/440.1 |
| 6,048,032 A * | 4/2000 | Stewart | | A47C 5/005 248/174 |
| 6,083,580 A * | 7/2000 | Finestone | | B31B 7/00 229/5.81 |
| 6,161,901 A * | 12/2000 | Avner | | A47C 5/005 108/165 |
| 6,164,477 A * | 12/2000 | Druckman | | A47B 43/02 220/6 |
| 6,206,473 B1 * | 3/2001 | Kondratiev | | A47B 13/003 297/440.1 |
| 7,625,047 B2 * | 12/2009 | Bertele | | A47B 43/02 297/440.12 |
| 8,403,422 B2 * | 3/2013 | Wu | | A47C 7/02 297/440.12 |
| 8,510,877 B2 * | 8/2013 | Helewa | | A47K 11/04 4/484 |
| 8,961,059 B2 * | 2/2015 | Reeves | | B64D 11/003 403/252 |
| D728,954 S * | 5/2015 | Meissner | | D6/371 |
| 9,185,984 B2 * | 11/2015 | Henke | | A47B 47/0008 |
| 2006/0214493 A1 * | 9/2006 | Yee | | A47B 13/04 297/445.1 |
| 2008/0237319 A1 * | 10/2008 | Hensey | | A47B 3/00 229/103 |
| 2014/0135193 A1 * | 5/2014 | Albarran-Torres | | A47B 47/06 493/390 |

* cited by examiner

SIDE

FRONT

| Single Face Corrugated | | Board Thickness (mm) | Flutes Per Meter |
|---|---|---|---|
| E Flute |  | ~1.1-1.8 | 295 +/- 10 |
| B Flute |  | ~2.1-3.0 | 154 +/- 10 |
| C Flute |  | ~3.2-3.9 | 128 +/- 10 |
| A Flute |  | ~4.0-4.8 | 108 +/- 10 |
| Single Wall Corrugated | | Board Thickness (mm) | Flutes Per Meter |
| B Flute |  | ~2.95 | 154 +/- 10 |
| C Flute |  | ~3.78 | 128 +/- 10 |
| Double Wall Corrugated | | Board Thickness (mm) | |
| EB Flute |  | ~4.06 | |
| BC Flute |  | ~6.50 | |
| CC Flute |  | ~7.33 | |

KRAFT MORTISE AND TENON ASSEMBLY

CROSS REFERENCE TO RELATED APPLICATIONS

The present application claims the benefit of the non-provisional application Ser. No. 14/620,181 filed Feb. 11, 2015 (titled RECYCLED CORRUGATED CHILD'S CHAIR, by Matthew Gerstle) and provisional application No. 61/938,913 filed Feb. 12, 2014 (titled RECYCLED CORRUGATED CHILD'S CHAIR, by Matthew Gerstle), which are both incorporated by reference herein. The present application is a Divisional Application of non-provisional application Ser. No. 14/620,181. Provisional application No. 61/938,913 and non-provisional application Ser. No. 14/620,181 are not admitted to be prior art with respect to the present invention by their mention in the background or cross-reference section.

BACKGROUND OF THE INVENTION

This invention relates to a mortise and tenon assembly. In an embodiment the mortise and tenon assembly may be a part furniture structures, for example a child's chair, consisting of substantially planar members which interlock without the use of tools or separate fasteners, and that are made from multi-layered, optionally recycled, corrugated or honeycomb Kraft (for example single face, single wall, double wall, triple wall), and that can be optionally recycled when no longer wanted by the consumer. The invention also relates to furniture structures or other structures that can pack flat during shipping, that are easy to assemble by the end-user without the use of tools or separate fasteners and that are made using multi-layer, optionally recycled, corrugated Kraft that is also optionally recyclable.

There has been a need in the art for lightweight, easy to assemble temporary structures including furniture and children's furniture. Other examples of structures include chairs, stools, tables, benches, shelves, items for loading products, display units, and packaging. In some cases it is desired to be able to recycle the item after it is used. Corrugated Kraft (for example cardboard) is a lightweight material. Items made from corrugated Kraft require special designing to provide rigid or strong structures.

Corrugated Kraft can be recycled, giving it a potentially sustainable complete lifecycle. The original Kraft can optionally be made from recycled material. The chair, for example, can be used for a period of time and then it can be recycled.

Cardboard is one generic term that can be used in place of Kraft, corrugated Kraft, corrugated cardboard, or flute. The art contains examples of cardboard structures with various assemblies and structural attachments and the art also contains examples of child's chairs made from tool-less assembly.

Another term that can be used in place of "corrugated Kraft" is "corrugated board". Other terms in the art for corrugated structures include single face, single wall and double wall.

Some glues and coatings used on cardboard assemblies, for example glue used to combine several individual layers of corrugated Kraft to make a multi-ply sheet, are not compatible with recycling, in a process known as re-pulping. There is an industry standard testing procedure to determine if a glue or additive is compatible with re-pulping.

U.S. Pat. No. 4,556,253 (Geneve, Heiligenstein and Melamed) Teaches a disposable chair made from a single unitary die-cut and scored blank sheet of material.

Structures have been made from corrugated paperboard with certain structural members. U.S. Pat. No. 4,266,670 (Grigsby, Banks and Grigsby, Jr.) Teaches a collapsible reinforced container using a structural member formed from a billet. It also teaches a manufacture built up of corrugated paperboard sheets.

Modular knockdown furniture has been made from a kit of inter-fitting parts. U.S. Pat. No. 5,407,250 (Prince, Phillips, Hodge and Kitchen) teaches quick to assemble modular chair with a compact packing arrangement.

U.S. Pat. No. 5,263,766 (McCullough) teaches a unit of child's furniture such as a chair or sofa that is constructed of intersecting panels provided with a unique interlocking joint which provides strength, rigidity and long life to such furniture. In one form, each panel is made of a pair of triple wall corrugated cardboard sheets which are individually slotted and channeled to provide different portions of its joint, and which thereafter have their sides cemented together to form a double thickness corrugated panel. The furniture is preferably made so it can be transported and stored in flat, knockdown condition and assembled when needed.

US 2007/0102986 A1 (Buhrman) teaches a chair assembly kit comprising at least two end pieces, at least two middle pieces including a first middle piece as a chair back and a second middle piece as a chair seat, and at least four locking pieces. The middle pieces each include at least two tabs, one tab each on two opposing sides and each tab defining a hole. The end pieces each include at least two slots configured to receive the tabs on the middle pieces. The locking pieces each include at least two posts each having a detent mechanism, the posts being received in the holes in the middle pieces. The middle pieces selectively couple to the end pieces, and the locking pieces selectively lock the middle pieces to the end pieces via the detent mechanisms, to form a chair.

U.S. Pat. No. 5,387,027 (Maloney) teaches a furniture structure for chairs, benches and the like consisting of substantially planar members which interlock and reversibly unlock without the use of tools or separate fasteners, comprises two sides, a seat member, a back and a front, the sides each having an upper edge, and the seat member including a forward edge and a rear edge. An interlocking sector on each of the sides interlocks with the seat member, the back and the front without the need for tools or separate fasteners. The interlocking sector includes first and second members on each of the sides for frictionally engaging the forward and rear edges of the seat member, respectively, in opposite directions. A third member on each of the sides frictionally engages the seat member in a direction substantially perpendicular to the opposite directions. Back locks on each of the sides interconnect the back to each of the sides, and include an upper back lock and a lower back lock, The lower back lock is separated from the upper back lock at least by a distance equal to the distance between the upper edges of the sides when the structure is in a fully assembled condition. A front lock on each of the sides interlocks the front to each of the sides.

US 2012/0056463 A1 (Berent and Hulewat) teaches an article of furniture and associated methods and kits comprising at least one first leg support structure, at least one second leg support structure, the at least one first leg support structure being inter-fitted with the at least one second first leg support structure via an interference fit to define a support assembly, a top that is supported by and attached to the support assembly without the need for a mechanical fastener or adhesive; and means for creating a force state that attaches the top to the support assembly without the need for a mechanical fastener or adhesive, and thereby stabilizes the article of furniture, wherein the force state includes one or more forces applied to the at least one first leg support structure and the at least one second leg support structure, in addition to any frictional force from the interference fit.

US 2009/0066140 A1 (Berent and Hulewat) teaches an article of furniture and associated methods and kits comprising at least one first leg support structure, at least one second leg support structure, the at least one first leg support structure being inter-fitted with the at least one second first leg support structure via an interference fit to define a support assembly, a top that is supported by and attached to the support assembly without the need for a mechanical fastener or adhesive; and means for creating a force state that attaches the top to the support assembly without the need for a mechanical fastener or adhesive, and thereby stabilizes the article of furniture, wherein the force state includes one or more forces applied to the at least one first leg support structure and the at least one second leg support structure, in addition to any frictional force from the interference fit.

U.S. Pat. No. 7,219,962 B2 (Stone) teaches a furniture system comprising mutually supporting components including a pair of identically configured side panels, a load supporting panels and a back panel. The back panel engages the side panels and the load supporting panel to provide rigidity to the furniture item. A locking member is provided that holds the furniture item rigidly in an assembled condition.

U.S. Pat. No. 6,109,695 (Kahwaji) teaches a chair assembly having detachably interfitting parts. A right hand side support of the chair assembly includes slots extending from the exterior profile of the first side support towards the center of the side support. A left hand side support similar to the right hand side support is also provided. A seat pan having extensions is fitted into two complementary slots of the right and left side supports. A back support having extensions is also fitted into two complementary slots of the right and left side supports. The seat pan and the back support may be independently adjusted so as to present various sitting positions.

U.S. Pat. No. 8,112,868 B2 (Miller) teaches a method for manufacturing a chair assembly with a customized backrest includes fabricating a standardized frame, preparing a contoured plywood blank for the backrest, selecting a customized design for the backrest and then converting the design for the backrest into a readable format, loading the readable format for the backrest design into a customized cutting apparatus, loading the blank into the cutting apparatus, cutting the blank in conformity with the selected backrest design, removing the completed blank from the cutting apparatus, mounting the backrest onto the frame, and lastly, mounting a seat onto the frame.

One way to connect two cardboard members together is using a dovetail and slot. U.S. Pat. No. 5,836,254 (Johansson) teaches a pallet having a plurality of parallel base beams, and a deck joined to the plurality of parallel base beams. The deck includes a web or sheet of material, which is folded to form a deck surface with a plurality of parallel panels adjoining each other, and a plurality of parallel projections on an underside thereof. Each base beam extends upward to contact the underside of the parallel panels, and includes at least one through-recess having a shape which corresponds to a cross-section of a corresponding one of the plurality of parallel projections. The corresponding parallel projection engages the recess thereby forming the pallet with a plurality of spaces to accommodate lifting forks between the plurality of parallel base beams. Lower surfaces of the plurality of parallel projections form lifting surfaces for the lifting forks.

All of these references contain at least one of the following shortcomings: the item is not made from multi-layered corrugated Kraft, the item does not have a tool-less assembly, thus complicating the assembly process, the item does not have robust connections that form a long-lasting tight connection, the item does not have the aesthetically pleasing look and feel of natural wood, the item is not made from all materials (coatings, inks, glues) that are compatible with municipal recycling.

Recyclable manufactured items can be tested for water re-pulpability to certify recyclability. A standard test method is TAPPI Method UM 213 (2012) "Re-pulpability of splices/splicing tape", and is incorporated by reference herein.

Thus, there is a significant need in the art for furniture structures for children that have at least one of the following traits: it is made from corrugated Kraft (lightweight, easy to ship), it has an easy, tool-less assembly, it is sturdy, it has the pleasing look and feel of natural wood, it can optionally be made from recycled material (and compatible with re-pulping), it is free-standing and can be moved without having to disassemble it. There is also a need in the art for sturdy, tool-less connections for structures made using substantially planar members made from layered corrugated Kraft.

BRIEF SUMMARY OF THE INVENTION

This invention relates a furniture assembly and structuring systems comprising the insertion of tenons of multilayered, optionally recycled, corrugated Kraft into mortises of panels of multi-layer, optionally recycled, corrugated Kraft in order to obtain furniture structures and other structures that are sturdy, as well as being light and self-supporting (or free-standing) and made from recycled or recyclable material. The invention also relates to a furniture assembly and structuring systems made from panels comprising layered corrugated Kraft comprising the insertion of a dovetail into a slot. The applications are multiple, ranging from items of furniture such as chairs, tables, benches, shelves, items for loading products, display units, and packagings. The assembly system is also designed to be set up in such a way that it is practical and easy for the user to assemble without needing to use tools or interlocking glue. It enables and facilitates the transport of the structures in parts prior to assembly arranged in a compact manner, occupying a relatively small space. The invention also relates to a furniture assembly and structuring system that is free-standing, meaning it can be picked up and moved without falling apart or disassembling into the separate panels.

The invention solves the shortcomings of the prior art and provides a useful structure needed in the art.

An embodiment of this invention is a furniture structure for chairs consisting of substantially planar members which interlock without the use of tools, interlocking glue or separate fasteners, comprising: two side members, a lateral support member, a seat member, a back member, wherein all of the members comprise at least two glued corrugated Kraft layers, and optionally at least three glued corrugated Kraft layers; the side members each having a floor contacting bottom edge, a front edge, a back edge, a substantially horizontal upper seat contact edge and a substantially vertical back support extension, a forward facing back member contacting edge, the side members each having a slot to accept a dovetail, the slot is positioned facing the inside of the chair and substantially located midway between the front and back of the chair, the side members each having at least one tenon extending from the upper seat contact edge and at least one tenon extending from the forward facing back member contacting edge, both tenons also containing a foldable flap extending beyond the length of the tenon, and the side members comprise at least one tuck slot in proximity to each tenon, the tuck slots positioned on the outside of the side members, facing away from the chair center; the seat member including a forward edge, a rear edge, two side edges distal to each other, two mortises located one each in proximity to each of the side edges, wherein each mortise forms a hole that penetrates the entire depth of the seat member, forming a pass-through opening that accepts the tenon on the upper seat contacting edge of the side members; the back member including a bottom edge, a top edge, two side edges distal to each other, and two mortises located one each in proximity to each of the side edges, wherein each mortise penetrates the entire depth of the back member, forming a pass-through opening that accepts the tenon on the forward facing back member contacting edge of the back support extension of the side members; the lateral support member including a bottom edge, a top edge, two side edges distal to each other, two substantially rectangular dovetails, one on each side edge of the lateral support; on each of the side members, a means for interlocking the side member with the lateral support member, each means for interlocking comprising a frictionally engaged dovetail and slot connection formed by slidibly inserting one of the dovetails of the lateral support member into the corresponding slot of the side members forming a substantially tight connection, and wherein the lateral support member is substantially perpendicular to each of the side members; on each of the side members, a means for interlocking the side member with the seat member, the means for interlocking comprising a mortise and tenon connection, wherein the tenon on each of the side members comprises an extended foldable flap, the tenon is slidibly inserted into the mortise of the seat member forming a substantially tight connection, and the connection is locked together by folding the extended flap around the outside of the seat member and the end of the flap is inserted into the tuck slot on the side member; on each of the side members, a means for interlocking with the back member, the means for interlocking means comprising a mortise and tenon connection, wherein the tenon on each of the side members comprises an extended foldable flap, the tenon is slidibly inserted into the mortise of the back member forming a substantially tight connection, and the connection is locked together by folding the extended flap around the outside of the back member and the end of the flap is inserted into the tuck slot on the side member.

Another embodiment is a tab on the end of the flap that is inserted into the tuck slot.

Another embodiment is a veneer layer glued to at least one surface or edge of at least one of the members.

Another embodiment is a wood veneer layer.

Another embodiment is at least one member comprising more than three corrugated Kraft layers.

Another embodiment is wherein the Kraft is selected from the group consisting of Kraft paper, fiberboard, chipboard, paperboard and paper honeycomb.

Another embodiment is wherein the corrugated Kraft comprises a flute that is selected from the group consisting of A flute, B flute, C flute D flute, G flute, N flute, double wall AB, double wall BC, double wall BB, double wall AC, E flute, double wall EE, F flute, double wall EB, double wall CC, triple wall EBE, triple wall ABB, triple wall CBC flute, and triple wall ACA flute.

Another embodiment is wherein the corrugated Kraft comprises a flute that is selected from the group consisting of A flute, B flute, C flute, double wall AB, double wall BC, double wall BB, double wall AC, E flute, double wall EE, F flute, double wall EB, double wall CC, triple wall EBE, triple wall ABB, and triple wall ACA flute.

Another embodiment is wherein the corrugated Kraft comprises a flute that is selected from the group consisting of C flute, double wall BC and double wall EE.

In another embodiment the corrugated Kraft comprises double wall BC and B flute, preferably three layers of double wall BC and one layer of B flute, optionally four layers of double wall BC.

In an embodiment the corrugated Kraft comprises optionally two layers of C flute, three or more layers of C flute, two layers of B flute or three or more layers of B flute.

Another embodiment is wherein the seat member comprises an outer planar surface, a recess along the outer planar surface and a recess along the fold-over edge, wherein the flap is folded into the two recesses and tucked into the tuck slot, and wherein the folded flap occupies a space in each recess and forms a substantially flush surface with the outer planar surface and fold-over edge of the seat member.

Another embodiment is wherein the back member comprises an outer planar surface, a recess along the outer planar surface and a recess along the fold-over edge, wherein the flap is folded into the two recesses and tucked into the tuck slot, and wherein the folded flap occupies a space in each recess and forms a substantially flush surface with the outer planar surface and fold-over edge of the seat member.

Another embodiment is further comprises a free-standing assembly.

An embodiment of this invention is a mortise and tenon assembly for two substantially planar members, the assembly comprising: a first member and a second member that each comprise at least two glued corrugated Kraft layers; the first member has a first contacting edge, and a first planar surface, the first contacting edge and first planar surface forming a substantially right-angled corner, and the second member has an inner planar surface, an outer planar surface and a fold-over edge, the inner planar surface and the outer planar surface are substantially parallel to each other and connected by the fold-over edge, each planar surface forming a substantially right-angled edge with the fold-over edge; the first member has a tenon-flap assembly that extends from the first contacting edge, the tenon-flap assembly is comprised of a tenon and a flap, wherein the tenon comprises at least one corrugated Kraft layer, and wherein the flap comprises at least one corrugated Kraft layer, the tenon and flap assembly comprises a multi-layer corrugated Kraft assembly comprising both the tenon and flap that in combination have at least two corrugated Kraft layers in total, wherein the flap extends a longer length from the first contacting edge than the length that the tenon extends from the first contacting edge, the first member further comprises at least one tuck slot in proximity to the tenon, wherein the tuck slot is located on the first planar surface; the second member has a mortise wherein the mortise penetrates the entire depth of the second member, forming a pass-through opening that accepts the tenon-flap assembly on the first member; a means for interlocking the first member and the second member, the mean for interlocking comprising a mortise and tenon connection, wherein the tenon on the first member is inserted by sliding into the mortise of the second member forming a substantially tight connection, and the connection is locked together by folding the extended flap around the fold-over edge of the second member and the flap is inserted into the tuck slot on the first member.

Another embodiment is wherein the first member and the second members each comprise at least three glued corrugated Kraft layers.

Another embodiment is wherein the first and second members are substantially perpendicular to each other.

Another embodiment is wherein the terminal end of the tenon, the end of the tenon that is furthest from the first contacting edge, extends into the mortise of the second member so that the terminal end of the tenon is substantially flush with the outer surface of the second member.

Another embodiment is wherein the tenon-flap assembly on the first member comprises a Kraft layer of the tenon-flap assembly that is furthest away from the fold-over outside edge of the second member, wherein the flap is folded over the other layers of the tenon-flap assembly, covering the exposed end of the tenon from view, and the flap is further folded around the fold-over edge of the second member and inserted into the tuck slot of the first member.

Another embodiment is wherein the flutes of the corrugated Kraft layers in the tenon and in the flap are aligned substantially parallel to each other.

Another embodiment is wherein the flutes of the corrugated Kraft layers in the flap are substantially perpendicular to the corrugated Kraft layers in the tenon.

Another embodiment is wherein the second member comprises a recess along the outer planar surface and a recess along the fold-over edge, wherein the flap is folded into the two recesses and tucked into the tuck slot, and wherein the folded flap occupies a space in each recess and forms a substantially flush surface with the outer planar surface and fold-over edge of the second planar member.

Another embodiment further comprises a tab on the end of the flap that is inserted into the tuck slot.

Another embodiment is further comprises a veneer layer glued to at least one surface or edge of at least one of the members.

Another embodiment is wherein the veneer layer is wood.

Another embodiment comprises at least one member comprising more than three corrugated Kraft layers.

Another embodiment is wherein the Kraft is selected from the group consisting of Kraft paper, fiberboard, chipboard, paperboard and paper honey comb.

Another embodiment is wherein the corrugated Kraft comprises a flute that is selected from the group consisting of A flute, B flute, C flute D flute, G flute, N flute, double wall AB, double wall BC, double wall BB, double wall AC, E flute, double wall EE, F flute, double wall EB, double wall CC, triple wall EBE, triple wall ABB, triple wall CBC flute, and triple wall ACA flute.

Another embodiment is wherein the corrugated Kraft comprises a flute that is selected from the group consisting of A flute, B flute, C flute, double wall AB, double wall BC, double wall BB, double wall AC, E flute, double wall EE, F flute, double wall EB, double wall CC, triple wall EBE, triple wall ABB, and triple wall ACA flute.

Another embodiment is wherein the corrugated Kraft comprises a flute that is selected from the group consisting of C flute, double wall BC and double wall EE.

Another embodiment is wherein the tenon has at least two corrugated Kraft layers, the tenon and flap assembly comprises a multi-layer corrugated Kraft assembly comprising both the tenon and flap that in combination have at least three corrugated Kraft layers.

An embodiment of this invention is a dovetail and slot assembly for two substantially planar members, the assembly comprising: a first member and a second member that each comprise at least two corrugated Kraft layers; the first member has a first contacting edge, and a first planar surface, the first contacting edge and first planar surface forming a substantially right-angled corner, and the second member has a second contacting edge and a substantially rectangular dovetail cantilevered from of the second contacting edge; the first planar surface having a slot to accept a dovetail, the slot optionally having a rounded entrance; the dovetail having a rectangular block and a fin, wherein the rectangular block is wider than the fin and the block is attached to the first member by the fin; wherein the fin comprises at least one continuous corrugated Kraft layer that also makes up at least a portion of the first member, and wherein the block comprises a center portion comprising a continuous corrugated Kraft layer that extends through the fin and into the first member, and the block comprises at least two more glued layers of corrugated Kraft than the number of layers of corrugated Kraft in the fin; a means for interlocking the first and second members, the means for interlocking comprising a frictionally engaged dovetail and slot connection formed by slidibly inserting the block of the dovetail into the slot of the first member forming a substantially tight connection, and wherein the first and second members are substantially perpendicular to each other.

Another embodiment is wherein the fin comprises at least three glued corrugated Kraft layers.

Another embodiment is wherein block comprises at least three layers of corrugated Kraft glued on each side of the fin, such that the block contains at least six more Kraft layers than the fin.

Another embodiment is wherein the flutes of the corrugate in the fin are perpendicular to flutes of at least one of the other layers in the block.

Another embodiment is wherein the flutes of the corrugate in the fin are aligned substantially parallel to a longitudinal axis of the dovetail.

Another embodiment comprises at least one member comprising more than three corrugated Kraft layers.

Another embodiment is wherein the Kraft is selected from the group consisting of Kraft paper, fiberboard, chipboard, paperboard and paper honey comb.

Another embodiment is wherein the corrugated Kraft comprises a flute that is selected from the group consisting of A flute, B flute, C flute D flute, G flute, N flute, double wall AB, double wall BC, double wall BB, double wall AC, E flute, double wall EE, F flute, double wall EB, double wall CC, triple wall EBE, triple wall ABB, triple wall CBC flute, and triple wall ACA flute.

Another embodiment is wherein the corrugated Kraft comprises a flute that is selected from the group consisting of A flute, B flute, C flute, double wall AB, double wall BC, double wall BB, double wall AC, E flute, double wall EE, F flute, double wall EB, double wall CC, triple wall EBE, triple wall ABB, and triple wall ACA flute.

Another embodiment is wherein the corrugated Kraft comprises a flute that is selected from the group consisting of C flute, double wall BC and double wall EE.

DETAILED DESCRIPTION OF THE INVENTION

Figure 1:
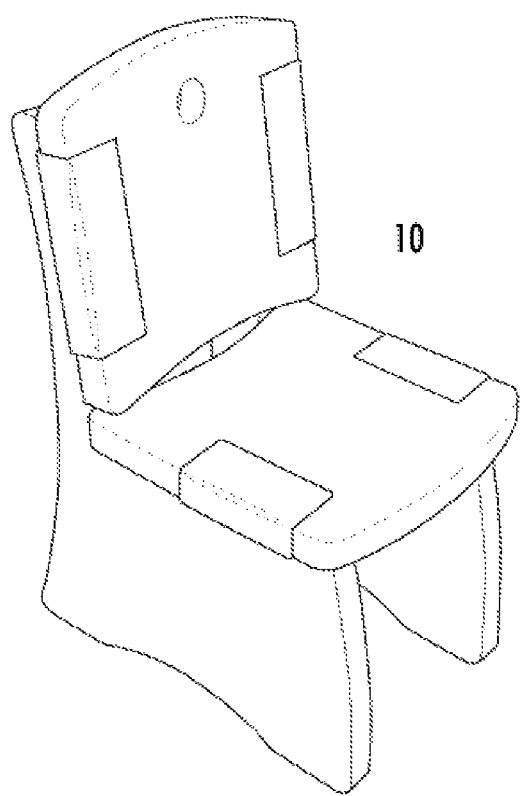
FIG. 1 Child's chair assembly.
Figure 2A:
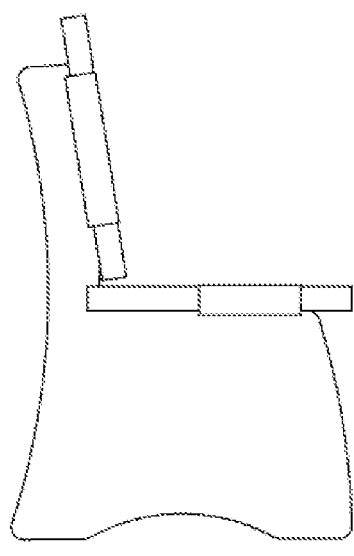
FIG. 2A Child's chair assembly side view.
Figure 2B:
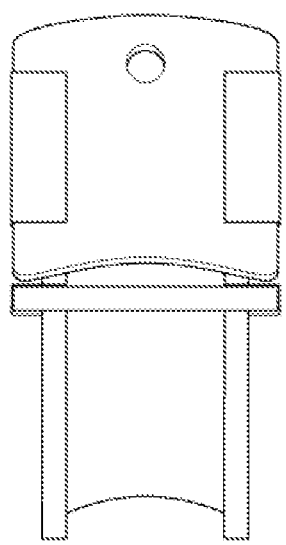
FIG. 2B Child's chair assembly front view.
Figure 2C:
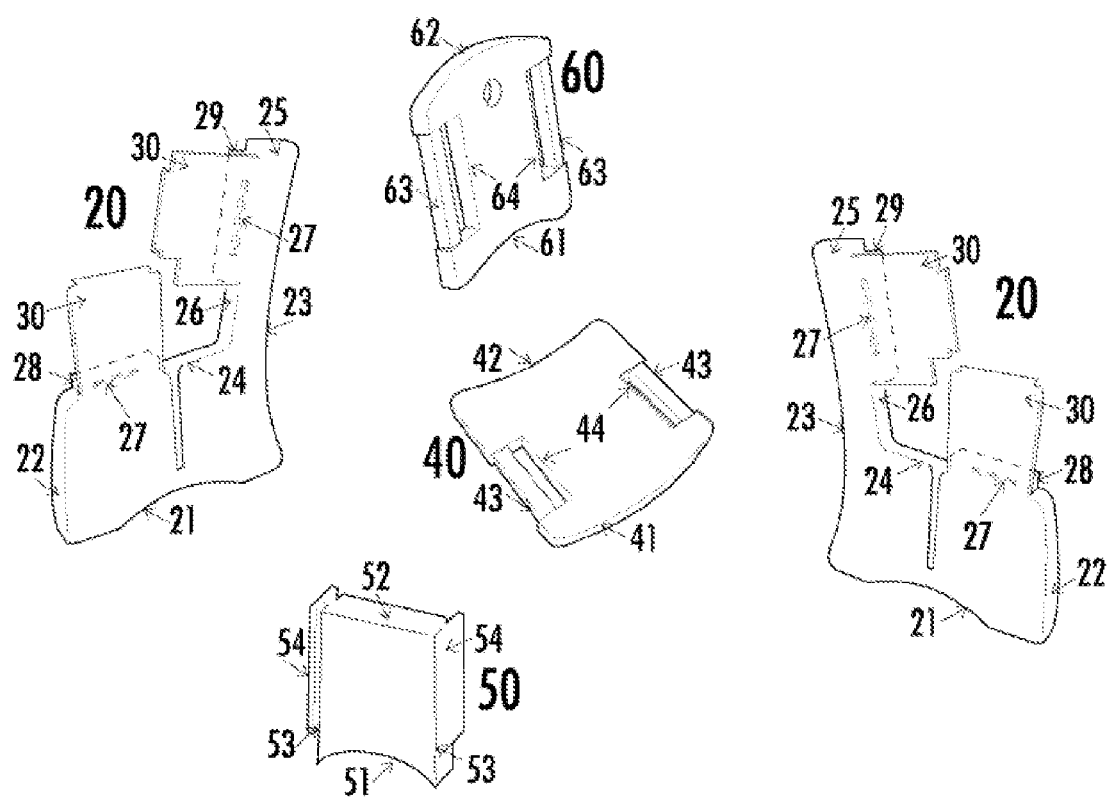
FIG. 2C Child's chair assembly exploded view.
Figure 3:
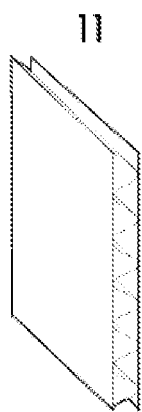
FIG. 3 Single wall corrugated Kraft layer.
Figure 4:
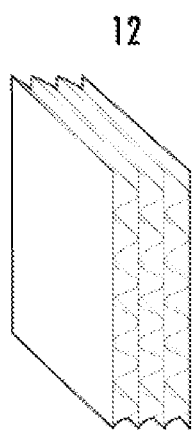
FIG. 4 Triple wall corrugated Kraft layer.
Figure 5:
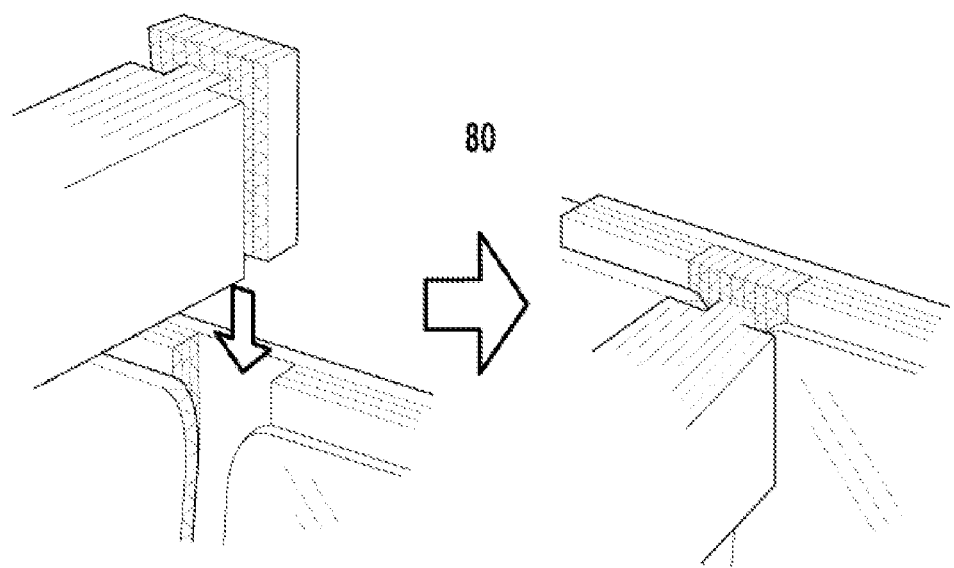
FIG. 5 Dovetail and slot interlocking means.
Figure 6:
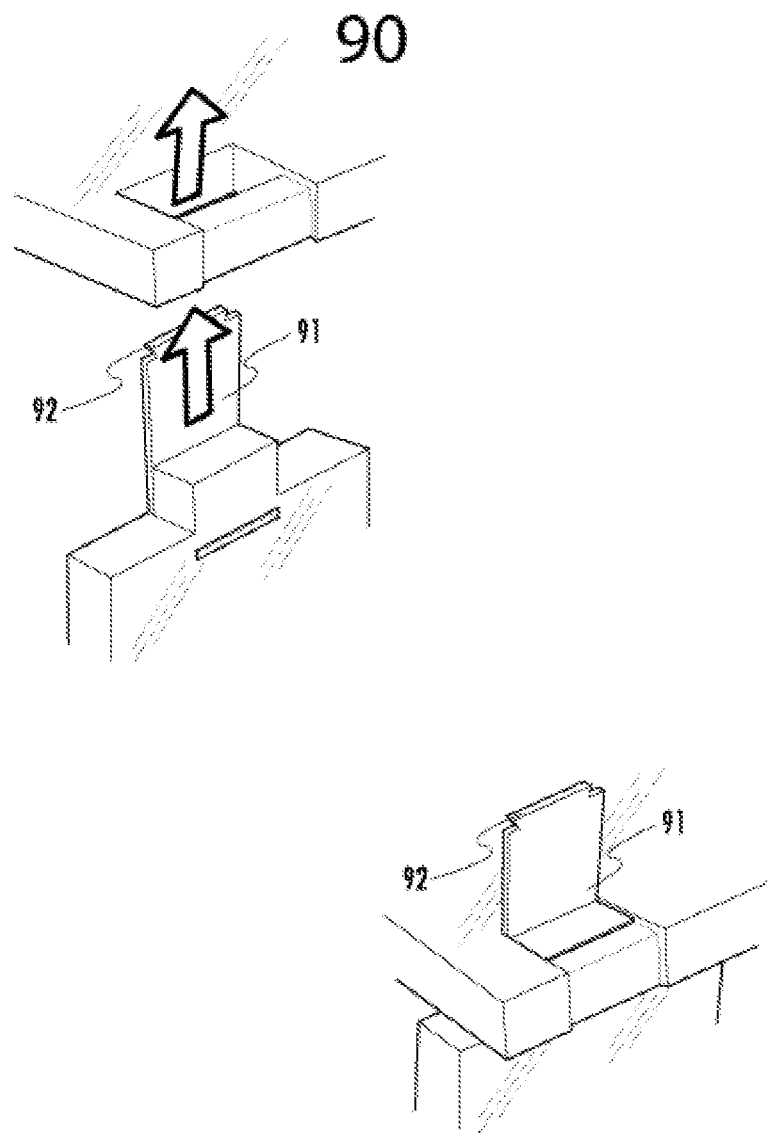
FIG. 6 Mortise and tenon interlocking means.
Figure 7:
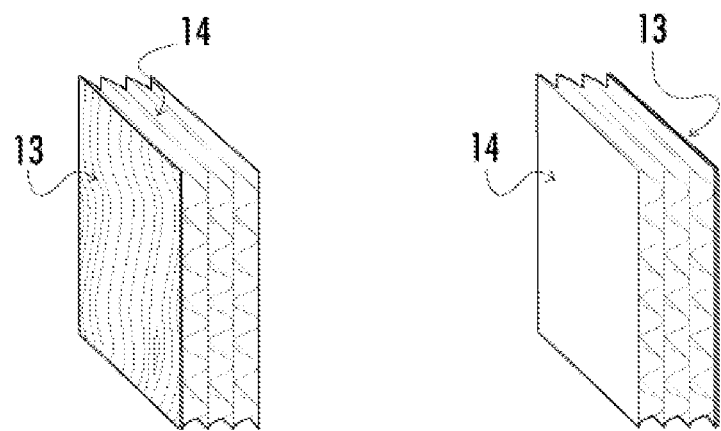
FIG. 7 Wood veneer on Kraft multi-layer.
Figure 8A:
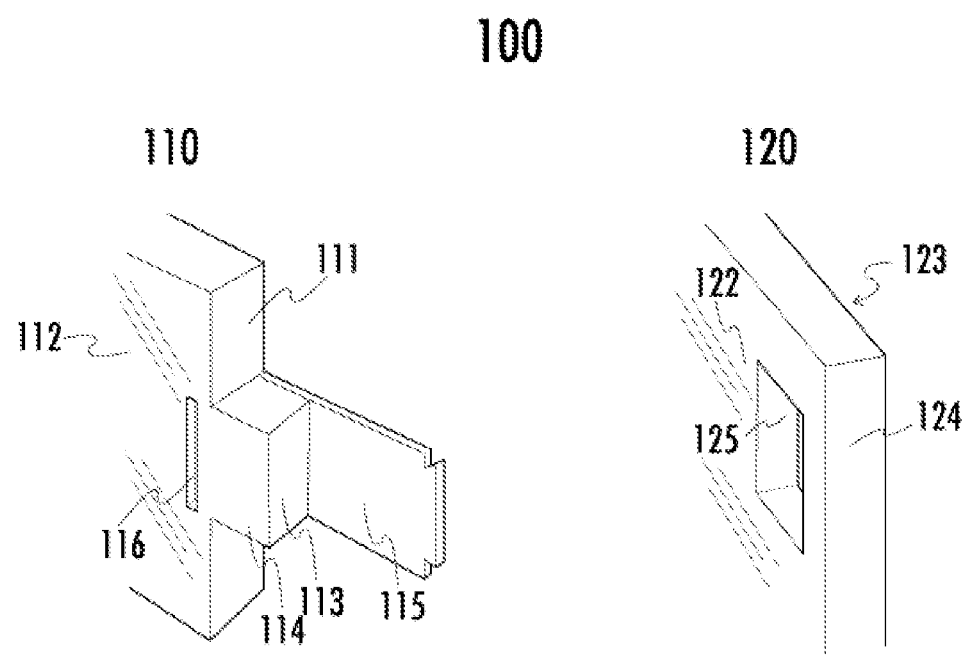
FIG. 8A Parts of a mortise and tenon assembly.
Figure 8B:
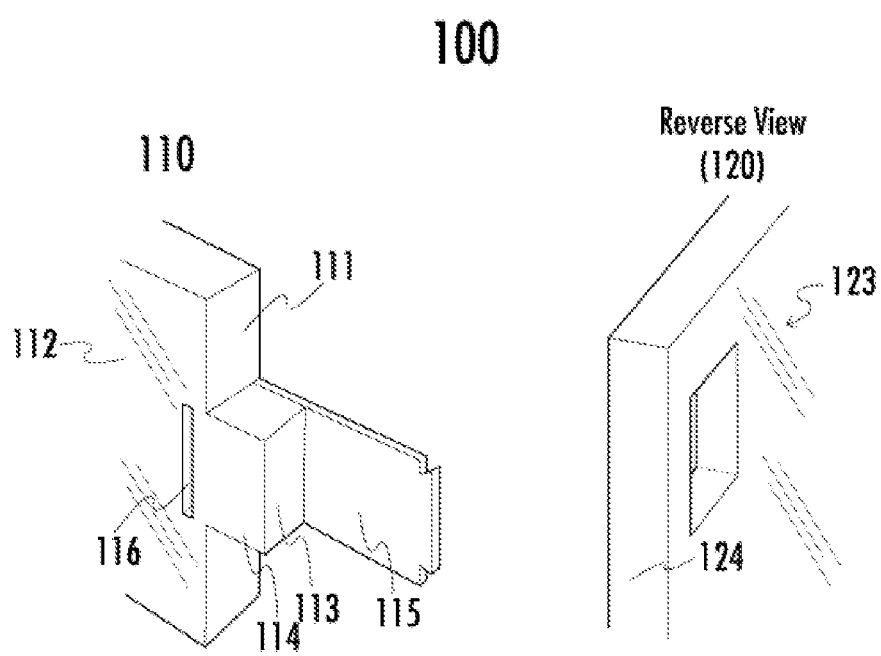
FIG. 8B Parts of a mortise and tenon assembly alternate view.
Figure 9A:
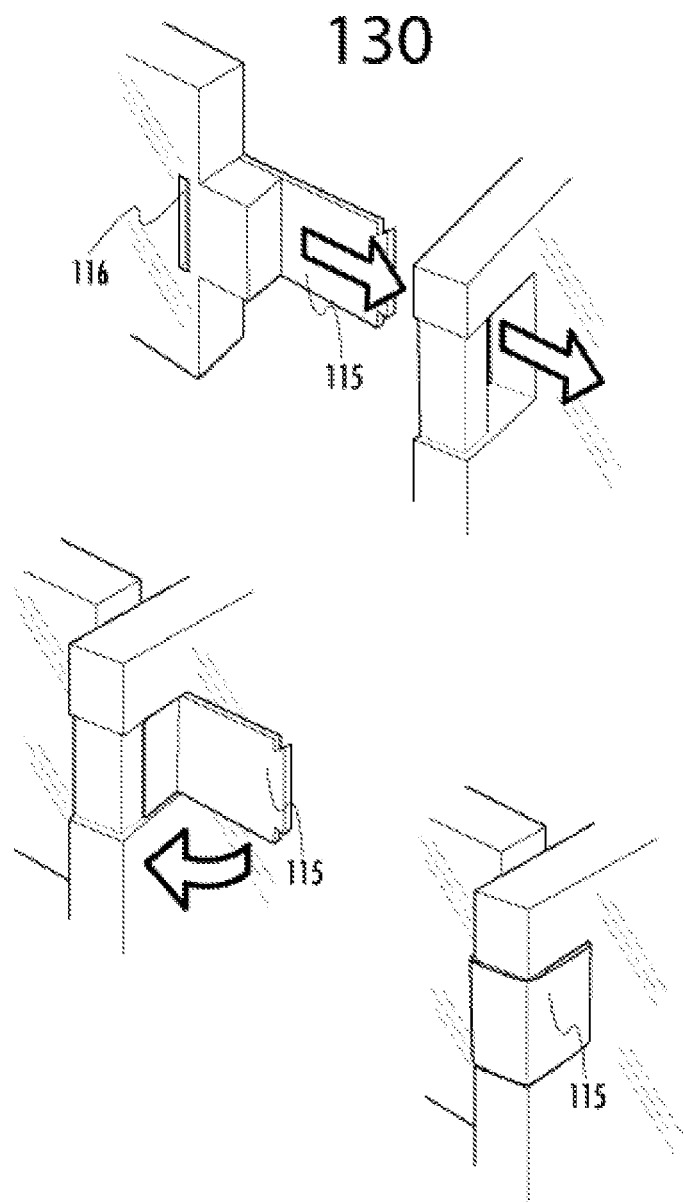
FIG. 9A Mortise and tenon assembly with recess.
Figure 9B:
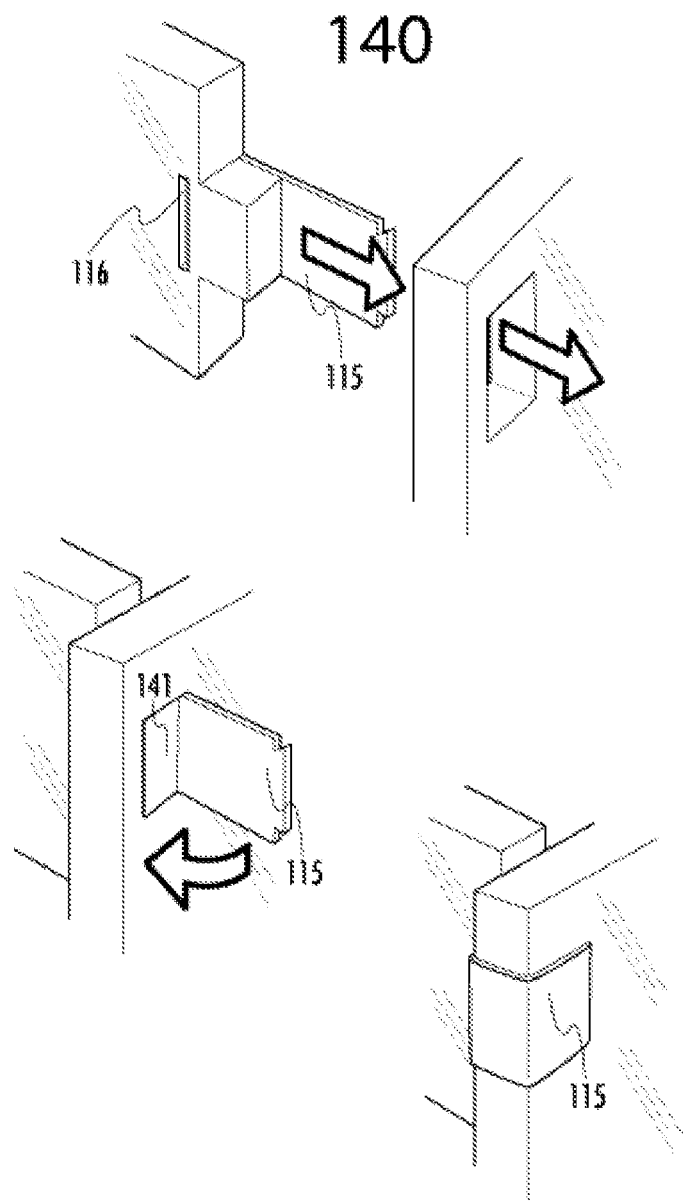
FIG. 9B Mortise and tenon assembly without recess.
Figure 10:
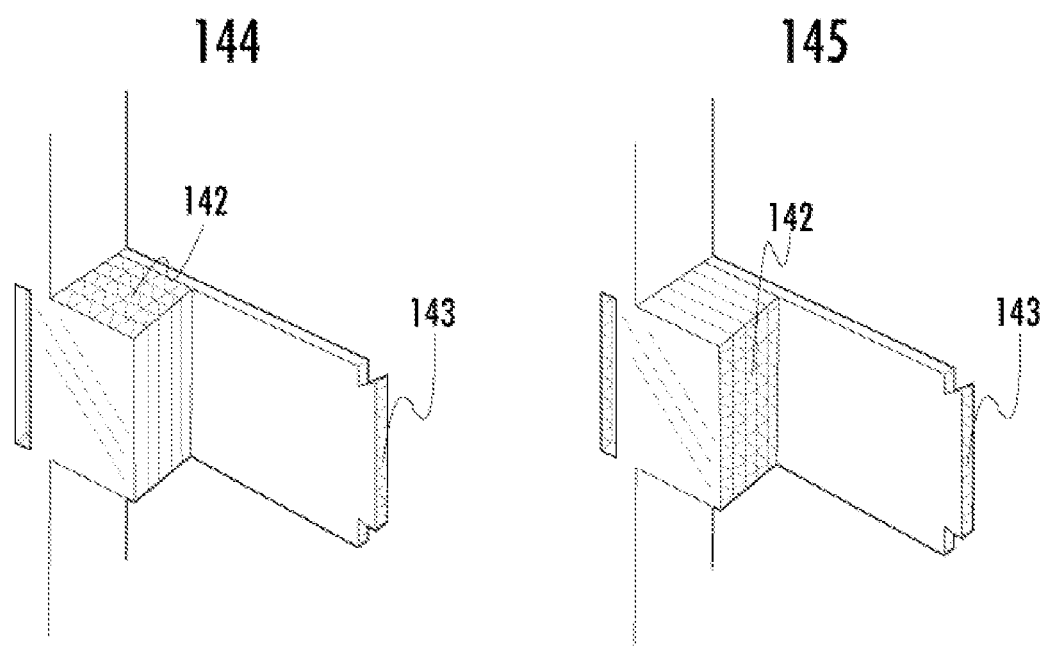
FIG. 10 Flutes in the tenon and flap assembly.
Figure 11:
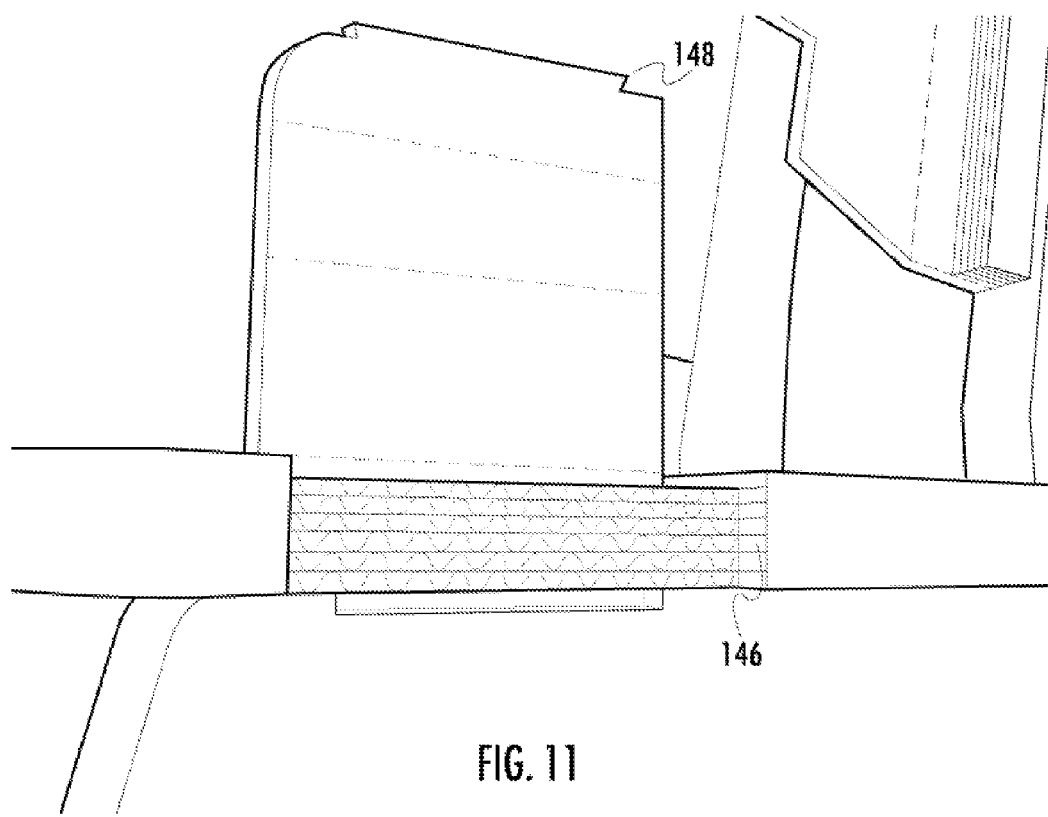
FIG. 11 Recess near mortise in planar member.
Figure 12:
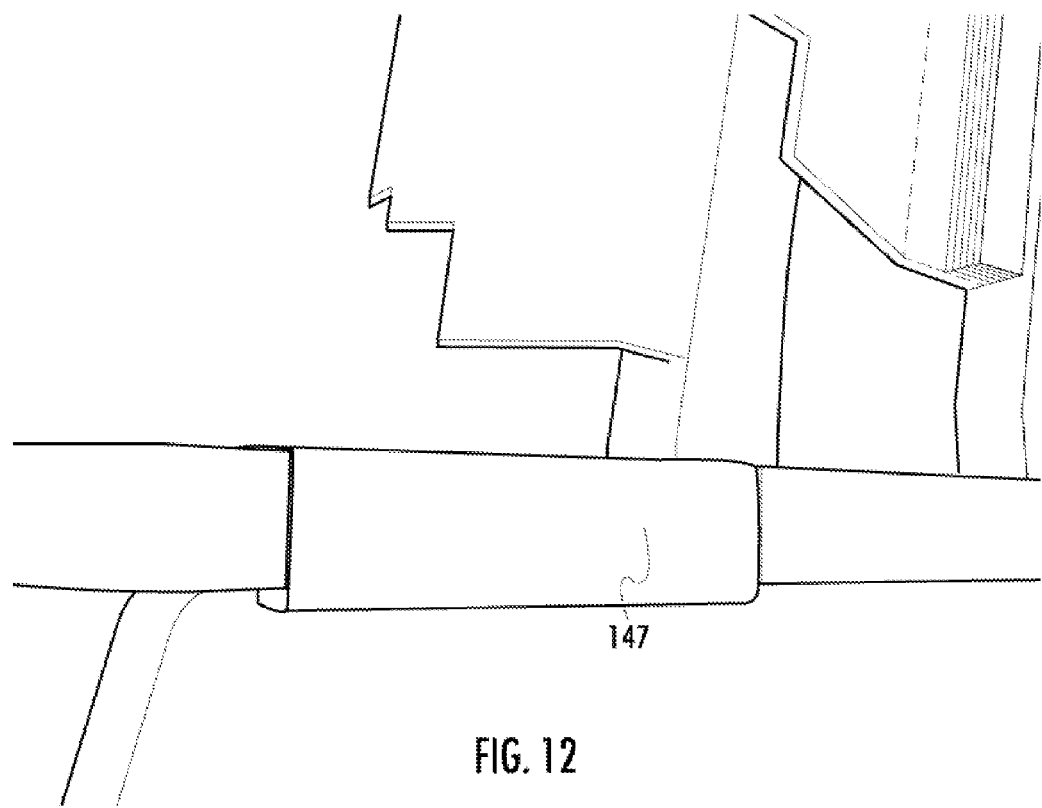
FIG. 12 Fold over flap flush with outer surface, occupying recess.
Figure 13:
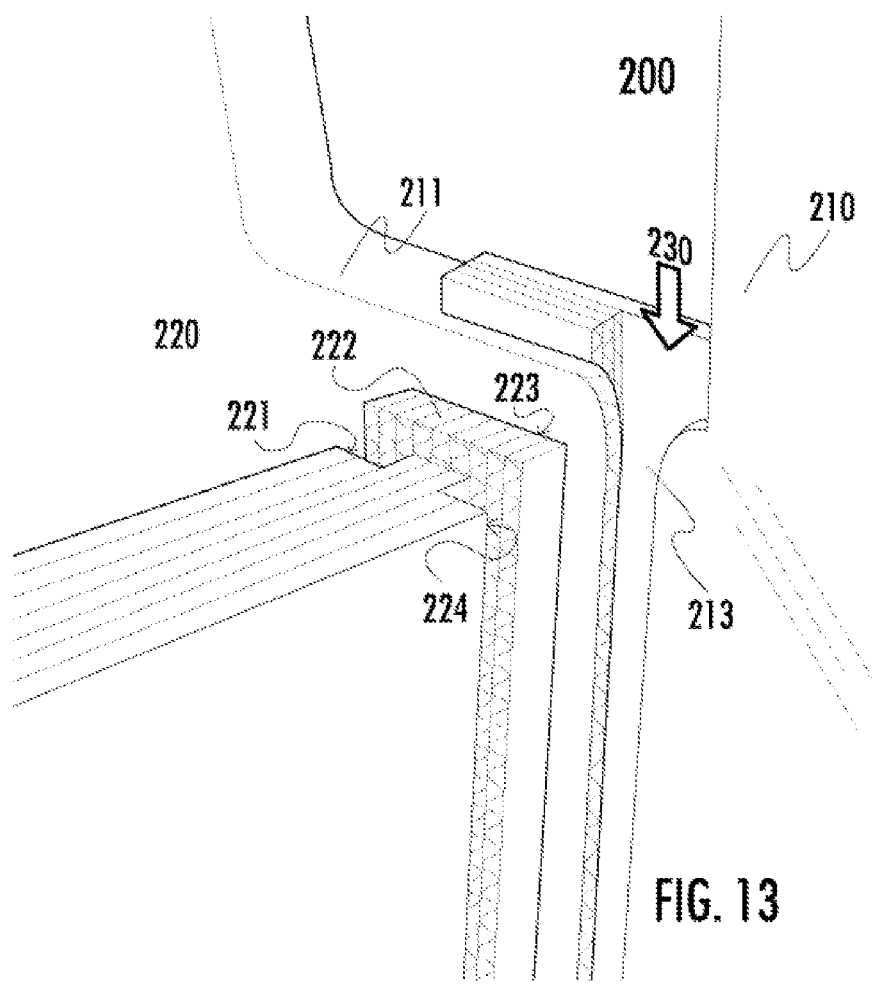
FIG. 13 Dovetail and slot.
Figure 14:
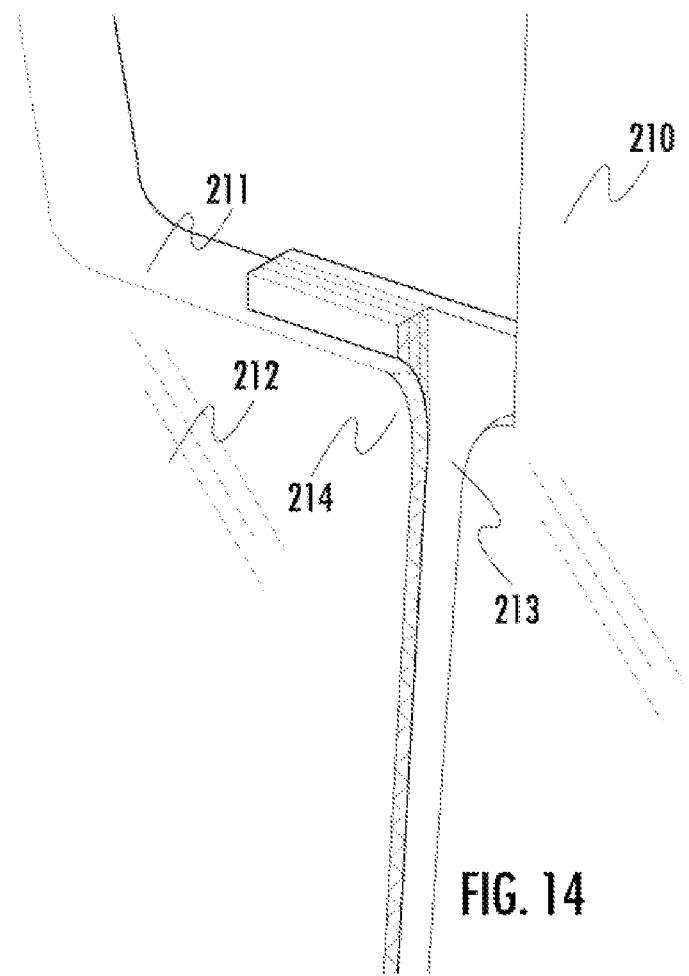
FIG. 14 Slot with rounded entrance.
Figure 15:
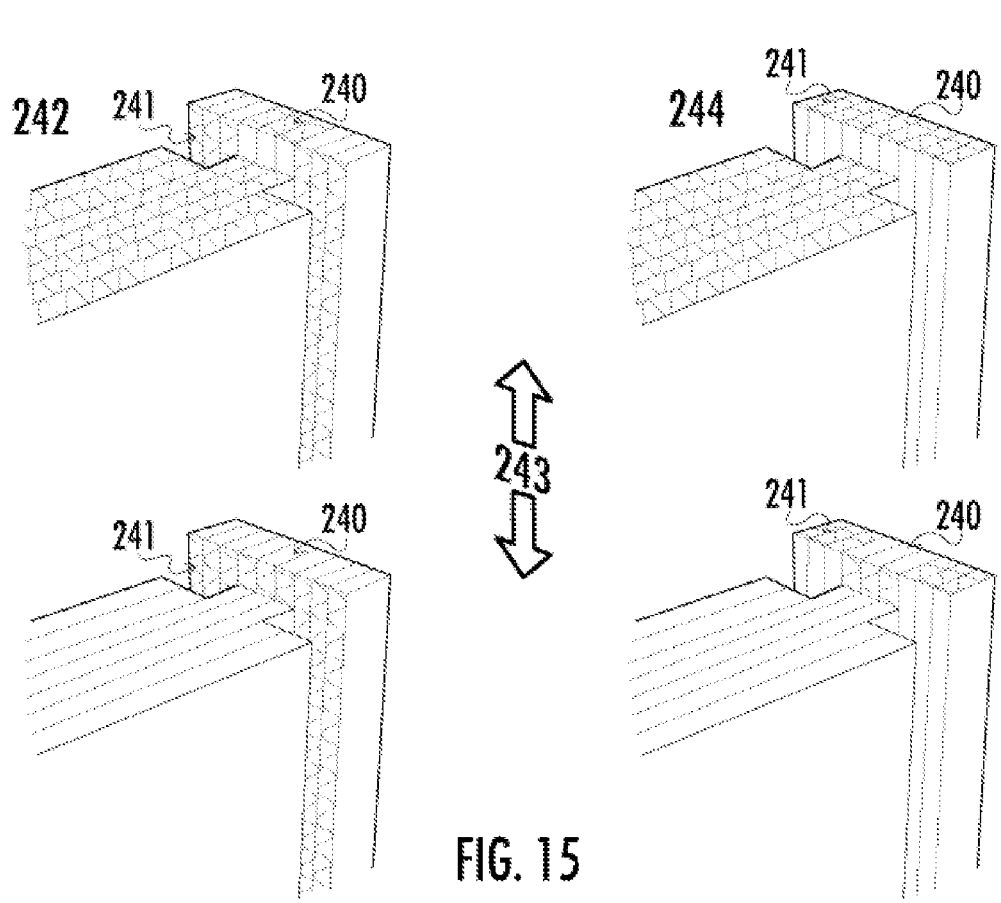
FIG. 15 Flutes in dovetail parts.
Figure 16:
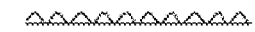
FIG. 16 Standard flute dimensions.
Figure 16:
Figure 16:
Figure 16:
Figure 16:
Figure 16:
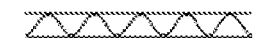
Figure 16:
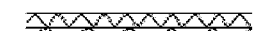
Figure 16:
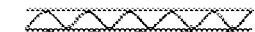
Figure 16:
Figure 17:
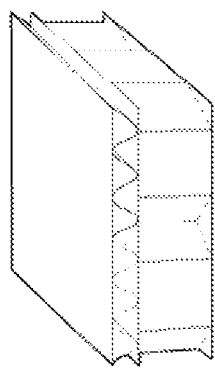
FIG. 17 Two layers of corrugated Kraft made from one flute layer and one honeycomb layer.
Figure 18:
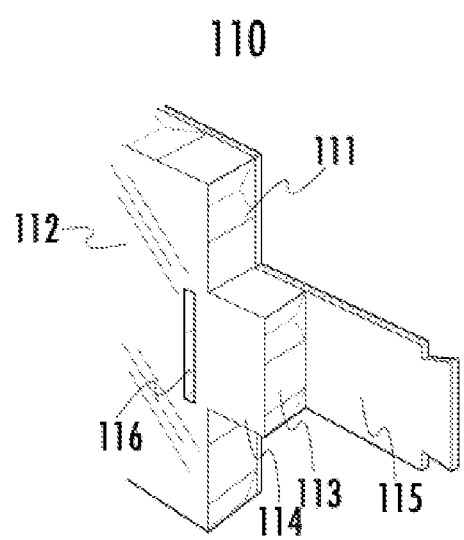
FIG. 18 Example of a first member containing a honeycomb Kraft layer.
Figure 19:
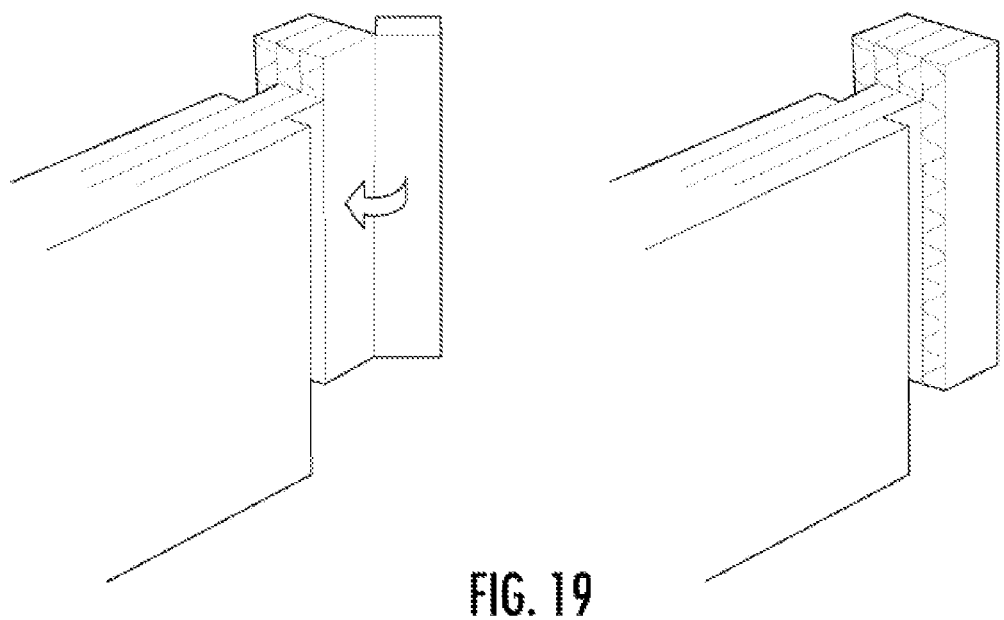
FIG. 19 Dovetail block made from folding over a scored section of the fin layer.

The summary of the invention above and in the Detailed Description of the Invention, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, and article "comprising" (or "which comprises") component A, B, and C can consist of (i.e. contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending on the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example 25 to 100 mm means a range whose lower limit is 25 mm, and whose upper limit is 100 mm.

One embodiment of the present invention comprises a child's chair assembly 10 that is made from substantially planar members that interlock without the use of tools, interlocking glue, or separate fasteners. The chair is assembled from a kit of parts that comprises two side members 20, a seat member 40, a lateral support member 50 and a back member 60. Kraft is a paper fiber-based material know to a Person Having Ordinary Skill in the Art. Corrugated Kraft layers contain flutes 14 aligned in a direction, the direction of the flutes can be the same or different for each layer in an assembly of Kraft layers. Common flute types include A flute, B flute, C flute, double wall BC, E flute, double wall EE, F flute, double wall EB, double wall CC, triple wall CBC flute, and triple wall ACA flute. It would be apparent to a Person Having Ordinary Skill in the Art that other similar structures could be substituted. One embodiment of the present invention is planar members made from glued corrugated Kraft layers, and a more preferred embodiment is a planar member made from a minimum of two glued Kraft layers. Another embodiment is a planar member made from a minimum of three glued Kraft layers.

The side members 20 comprise a floor contacting edge 21, a front edge 22, a back edge 23, a substantially horizontal upper seat contact edge 24, a substantially vertical back support extension 25, a forward facing back member contacting edge 26, a tuck slot 27, a tenon extending from the seat member contact edge 28, a tenon extending from the forward facing back member contacting edge 29, and foldable flaps 30.

The seat member 40 comprises a forward edge 41, a rear edge 42, side edges 43, and at least two mortises 44. In a preferred embodiment the seat member has two mortises.

The back member 60 comprises a bottom edge 61, a top edge 62, two side edges 63 distal to each other, a mortise 64 (located one each in proximity to each of the side edges).

The lateral support comprises a bottom edge 51, a top edge 52, two side edges 53 distal to each other, and two substantially rectangular dovetails 54, one on each side of the lateral support.

The chair comprises a dovetail and slot interlocking means (a "means for" interlocking) 80 for connecting the side members to the lateral support. The chair also comprises mortise and tenon means (a "means for" interlocking) 90 for connecting the seat member and back member to the side members. The tenons comprise an extended folding flap 91. The folding flap may optionally have a tab 92 on the end of the flap.

The present invention provides a child's chair with the look and feel of real wood. Real wood is aesthetically pleasing, both visually and to the touch. One embodiment of the present invention is a wood veneer 13 glued at least to one of the outer layers of the planar members used to make the chair.

Another embodiment of this invention is a mortise and tenon assembly made from at least two substantially planar members, the members each made from a minimum of two corrugated Kraft layers, more preferably a minimum of three corrugated Kraft layers. The mortise and tenon assembly provides for the first time a tight-fitting and interlocking connection with a fold over flap and tuck slot. The assembled connection is functional and has a pleasing appearance because the interior flute structure of the corrugate used to make the tenon is covered by the smooth surface of the fold over flap.

The applications of the disclosed mortise and tenon are multiple, ranging from items of furniture such as chairs, tables, shelves, stools, items for loading products, display units, and packagings. The assembly system is also designed to be set up in such a way that it is practical and easy for the user, without needing to use tools. It enables and facilitates the transport of the structures in parts prior to assembly arranged in a compact manner, occupying a relatively small space.

The mortise and tenon assembly 100 comprises a first member 110 with a first contacting edge 111 and a first planar surface 112, a tenon-flap assembly 113 on the first contacting edge, wherein the tenon-flap assembly comprises a tenon 114 and a flap 115. The first member 110 also comprises a tuck slot 116 on the first planar surface in proximity to the tenon.

The second member 120 comprises an inner planar surface 122, an outer planar surface 123, a fold-over edge 124 and a mortise 125 in proximity to the fold-over edge.

The mortise and tenon assembly comprises an interlocking means (a "means for" interlocking) 130 where the tenon is slidibly inserted into the mortise forming a substantially tight connection, and further the fold-over flap is folded around the fold-over edge and inserted into the tuck slot. In one embodiment the end of the tenon and the outer planar surface of the second member form a substantially flush surface 140. In this embodiment the fold-over flap is not flush with the second member outer planar surface. In another embodiment the fold-over flap is positioned 141 furthest from the fold-over edge so that once folded it covers the other layers of the tenon. The flutes of the tenon 142 and the flutes of the flap 143 are aligned independent from each other. In one embodiment The flutes of the tenon 142 and the flutes of the flap 143 are aligned parallel 144 to each other. In a more preferred embodiment The flutes of the tenon 142 and the flutes of the flap 143 are aligned perpendicular 145 to each other. This perpendicular alignment is best for providing a stiff tenon and a fold-over flap that easily and uniformly folds at the proper location to form a tight connection. The flap is preferably folded with the flutes perpendicular to the fold crease.

In one embodiment the second planar member comprises a recess 146 to accept the fold-over flap. When the flap is folded and occupies the recess, the flap forms a substantially flush surface 147 with the outer planar surface 123. In another embodiment the fold-over flap comprises a tab 148 on the end to facilitate insertion into the tuck slot, and forming a tight connection.

Another embodiment of this invention is a dovetail and slot assembly made from at least two substantially planar members, the members each made from a minimum of two corrugated Kraft layers, and more preferably a minimum of three corrugated Kraft layers. The dovetail and slot assembly provides a sturdy and tight-fitting interlocking connection.

The applications of the disclosed dovetail and slot are multiple, also ranging from items of furniture such as chairs, benches, tables, shelves, stools, items for loading products, display units, and packagings. The assembly system is also designed to be set up in such a way that it is practical and easy for the user, without needing to use tools. It enables and facilitates the transport of the structures in parts prior to assembly arranged in a compact manner, occupying a relatively small space.

The dovetail and slot assembly 200 comprises a first member 210 with a first contacting edge 211, a first planar surface 212, a slot 213, and optionally, a rounded entrance 214. The second member 220 comprises a second contacting edge, a dovetail, wherein the dovetail comprises a rectangular block 223 and a fin 224.

The dovetail and slot assembly comprises an interlocking means (a "means for" interlocking) 230 where the dovetail is slidibly inserted into the slot forming a substantially tight connection. The flutes in the fin 240 are preferably aligned parallel to the longitudinal axis of the dovetail 243. This alignment provides a rigid fin in the assembly. The flutes in the block 241 are preferably aligned perpendicular 242 to the flutes in the fin. This alignment provides torsional and flexural rigidity to the assembly. The flutes in the block may optionally be aligned parallel 244 to the longitudinal axis of the dovetail and also to the flutes in the fin.

Kraft paper or Kraft (kraft) is paper or paperboard (also called cardboard) produced from chemical pulp produced in the Kraft process. Pulp produced by the Kraft process is stronger than that made by other pulping processes; acidic sulfite processes degrade cellulose more, leading to weaker fibers, and mechanical pulping processes leave most of the lignin with the fibers, whereas Kraft pulping removes most of the lignin present originally in the wood. Low lignin is important to the resulting strength of the paper, as the hydrophobic nature of lignin interferes with the formation of the hydrogen bonds between cellulose (and hemicellulose) in the fibers.

Kraft pulp is darker than other wood pulps, but it can be bleached to make very white pulp. Fully bleached Kraft pulp is used to make high quality paper where strength, whiteness and resistance to yellowing are important.

The term "fiberboard" means a type of engineered wood product that is made out of wood fibers. Types of fiberboard (in order of increasing density) include particle board, medium-density fiberboard, and hardboard. Fiberboard is sometimes used as a synonym for particle board, but particle board usually refers to low-density fiberboard. Fiberboard, particularly medium-density fiberboard (MDF), is heavily used in the furniture industry. For pieces that will be visible, a veneer of wood is often glued onto fiberboard to give it the appearance of conventional wood.

The term "Chipboard" means a type of paperboard generally made from reclaimed paper stock.

The term "paperboard" means a thick paper-based material with a thickness at least 0.25 mm. Paperboard can be single or multi-ply. Paperboard can be easily cut and formed, is lightweight, and because it is strong, is used in packaging.

The term "cardboard" is a general term used to refer to any heavy paper pulp based board.

The term "free-standing" as in the usage "a free-standing structure" or as in the usage "a free-standing assembly" means a structure or assembly that once assembled it can be picked up, moved, rotated or otherwise translated from one orientation to another without causing any of the panels, or parts, to disassemble.

Honeycomb is another type of structured Kraft that is understood to a Person Having Ordinary Skill in The Art. Unlike corrugate Kraft, with flute edges aligning in contact with the external Kraft sheets, the honeycomb structure is positioned perpendicular to the outer Kraft sheets.

The term "flute" is understood to a Person Having Ordinary Skill in the Art as a rounded or pleated structure used to make corrugated Kraft.

The term "interlocking glue" means a glue or adhesive material that is applied and used during assembly of the interlocking panels. This term has been defined to avoid confusing "interlocking glue" with the "glue" that is used to bond individual corrugated Kraft layers in the production of the substantially planar panels. At the time of assembly, the panels would have been previously manufactured using a "glue" to make multi-ply corrugated Kraft. However, the person who will assemble the furniture structure or other assembly will not require any "interlocking glue" to assemble the structure.

Although the present invention has been described in considerable detail with reference to certain preferred version thereof, other versions are possible. For example children's furniture, adult furniture, school or institutional furniture, corporate furniture, toys, play houses, stage sets, exhibit or trade show booths, temporary spaces, shelving, storage, containers, organization bins, temporary housing, decorative boxes, doll furniture, building blocks, office furniture, entertainment furniture, tables, desks, bookshelves, beds, headboards, side tables, night stands, coffee tables, TV stands, drafting tables, dining room chairs and table, dressers, wardrobes, ottoman, storage benches, toy boxes, bunk beds, file cabinet. Therefore, the spirit and scope of the appended claims should not be limited to the description of the preferred versions contained herein.

The reader's attention is directed to all references which are filed concurrently with this specification and which are incorporated herein by reference.

All the features in this specification (including any accompanying claims, abstract, and drawings) may be replaced by alternative features serving the same, equivalent or similar purpose, unless expressly stated otherwise. Thus, unless expressly stated otherwise, each feature disclosed in one example only of a generic series of equivalent of similar features.

Any element in a claim that does not explicitly state "means for" performing a specific function, or "step for" performing a specific function, is not to be interpreted as a "means" or "step" clause as specified in 35 U.S.C. §112, ¶6.

What is claimed is:

1. A mortise and tenon assembly for two substantially planar members, the assembly comprising:
    a first member and a second member that each comprises at least two glued layers selected from corrugated Kraft layers and honeycomb Kraft layers;
    the first member has a first contacting edge, and a first planar surface, the first contacting edge and first planar surface forming a substantially right-angled corner, and the second member has an inner planar surface, an outer planar surface and a fold-over edge, the inner planar surface and the outer planar surface are substantially parallel to each other and connected by the fold-over edge, each planar surface forming a substantially right-angled edge with the fold-over edge;
    the first member has a tenon-flap assembly that extends from the first contacting edge, the tenon-flap assembly is comprised of a tenon and a flap, wherein the tenon comprises at least one layer selected from the group consisting of corrugated Kraft layer, and honeycomb Kraft layer, and wherein the flap comprises at least one corrugated Kraft layer, the tenon and flap assembly comprises a multi-layer corrugated Kraft assembly comprising both the tenon and flap that in combination have at least two corrugated Kraft layers in total, wherein the flap extends a longer length from the first contacting edge than the length that the tenon extends from the first contacting edge, the first member further comprises at least one tuck slot in proximity to the tenon, wherein the tuck slot is located on the first planar surface;
    the second member has a mortise wherein the mortise penetrates the second member, forming a pass-through opening that accepts the tenon-flap assembly on the first member; and
    a means for interlocking the first member and the second member, the mean for interlocking comprising a mortise and tenon connection, wherein the tenon on the first member is inserted by sliding into the mortise of the second member forming a substantially tight connection, and the connection is locked together by folding the extended flap around the fold-over edge of the second member and the flap is inserted into the tuck slot on the first member.

2. The assembly of claim 1 wherein the first and second members are substantially perpendicular to each other.

3. The assembly of claim 1, wherein a terminal end of the tenon, the end of the tenon that is furthest from the first contacting edge, extends into the mortise of the second member so that the terminal end of the tenon is substantially flush with the outer surface of the second member.

4. The assembly of claim 1, wherein the tenon-flap assembly on the first member comprises a Kraft layer of the tenon-flap assembly that is furthest away from the fold-over outside edge of the second member, wherein the flap is folded over other layers of the tenon-flap assembly, covering exposed ends of the tenon from view, and the flap is further folded around the fold-over edge of the second member and inserted into the tuck slot of the first member.

5. The assembly of claim 1 wherein flutes of the corrugated Kraft layers in the tenon and in the flap are aligned substantially parallel to each other.

6. The assembly of claim 1 wherein flutes of the corrugated Kraft layers in the flap are substantially perpendicular to the corrugated Kraft layers in the tenon.

7. The assembly of claim 1 wherein the second member comprises a recess along the outer planar surface and a recess along the fold-over edge, wherein the flap is folded into the two recesses and tucked into the tuck slot, and wherein the folded flap occupies a space in each recess and forms a substantially flush surface with the outer planar surface and fold-over edge of the second member.

8. The assembly of claim 1, further comprising a tab on the flap that is inserted into the tuck slot.

9. The assembly of claim 1, further comprising a veneer layer glued to at least one surface or edge of at least one of the members.

10. The assembly of claim 9, wherein the veneer layer is wood.

11. The assembly of claim 1, wherein the Kraft is selected from Kraft paper, fiberboard, chipboard, paperboard and paper honey comb.

12. The assembly of claim 1, wherein the corrugated Kraft comprises a flute that is selected from the group consisting of A flute, B flute, C flute D flute, G flute, N flute, double wall AB, double wall BC, double wall BB, double wall AC, E flute, double wall EE, F flute, double wall EB, double wall CC, triple wall EBE, triple wall ABB, triple wall CBC flute, and triple wall ACA flute.

13. The assembly of claim 1, wherein the tenon has at least two corrugated Kraft layers, the tenon and flap assembly comprises a multi-layer corrugated Kraft assembly comprising both the tenon and flap that in combination have at least three corrugated Kraft layers.

* * * * *